US010497264B2

(12) United States Patent
Rowell (10) Patent No.: US 10,497,264 B2
(45) Date of Patent: Dec. 3, 2019

(54) METHODS AND SYSTEMS FOR PROVIDING WARNINGS OF OBSTACLE OBJECTS

(71) Applicant: Toyota Research Institute, Inc., Los Altos, CA (US)

(72) Inventor: Todd J. Rowell, Arlington, MA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 0 days.

(21) Appl. No.: 15/883,176

(22) Filed: Jan. 30, 2018

(65) Prior Publication Data

US 2019/0096256 A1 Mar. 28, 2019

Related U.S. Application Data

(60) Provisional application No. 62/563,631, filed on Sep. 26, 2017.

(51) Int. Cl.
| | |
|---|---|
| G08G 1/16 | (2006.01) |
| G06T 7/246 | (2017.01) |
| G06K 9/00 | (2006.01) |
| G06K 9/62 | (2006.01) |
| G01S 17/93 | (2006.01) |
| G01S 15/58 | (2006.01) |
| G01S 17/58 | (2006.01) |
| G01S 15/93 | (2006.01) |

(Continued)

(52) U.S. Cl.
CPC ............ *G08G 1/166* (2013.01); *G01S 15/58* (2013.01); *G01S 15/66* (2013.01); *G01S 15/931* (2013.01); *G01S 17/58* (2013.01); *G01S 17/936* (2013.01); *G06K 9/00805* (2013.01); *G06K 9/627* (2013.01); *G06T 7/248* (2017.01); *G01C 3/00* (2013.01); *G06T 2207/30241* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 7,369,041 | B2 | 5/2008 | Nakanishi et al. |
| 8,655,019 | B2 | 2/2014 | Kamiyama |

(Continued)

FOREIGN PATENT DOCUMENTS

DE 102005042913 3/2007

*Primary Examiner* — Thomas S McCormack
(74) *Attorney, Agent, or Firm* — Dinsmore & Shohl LLP (57) ABSTRACT

Vehicles systems for predicting a trajectory of an object proximate to vehicles are disclosed. A vehicle system includes one or more sensors, one or more processors communicatively coupled to the one or more sensors, a memory module communicatively coupled to the one or more processors, and machine readable instructions stored in the memory module. The machine readable instructions, when executed by the processor, cause the system to: detect an object based on one or more signals output by the one or more sensors; classify the object into an object classification; predict a trajectory of the object based on at least one behavior characteristic of the object determined from a model corresponding to the object classification; predict a trajectory of the vehicle; and provide a warning when the detected object is likely to move from a non-obstacle position to an obstacle position based on the predicted trajectories of the object and the vehicle.

20 Claims, 9 Drawing Sheets

(51) Int. Cl.
   *G01S 15/66*   (2006.01)
   *G01C 3/00*    (2006.01)

(56) References Cited

U.S. PATENT DOCUMENTS

| | | |
|---|---|---|
| 8,676,487 B2 | 3/2014 | Sakai et al. |
| 8,988,525 B2 | 3/2015 | Thompson et al. |
| 8,994,520 B2 | 3/2015 | Stahlin et al. |
| 9,569,967 B2 | 2/2017 | Philemon et al. |
| 2005/0107955 A1* | 5/2005 | Isaji .................... B60R 21/0134 701/301 |
| 2014/0067206 A1* | 3/2014 | Pflug .................... B60W 10/04 701/41 |
| 2016/0280133 A1 | 9/2016 | Salomonsson |
| 2017/0066449 A1* | 3/2017 | Lee ...................... B60G 17/019 |
| 2017/0120814 A1* | 5/2017 | Kentley ............... G10K 11/346 |
| 2017/0132334 A1* | 5/2017 | Levinson ............ G06F 17/5009 |
| 2017/0166123 A1* | 6/2017 | Bahgat ............... B60W 50/0097 |
| 2018/0105107 A1* | 4/2018 | Hassan-Shafique ... B60Q 9/008 |

\* cited by examiner

METHODS AND SYSTEMS FOR PROVIDING WARNINGS OF OBSTACLE OBJECTS

CROSS-REFERENCE TO RELATED APPLICATION

The application claims priority to U.S. Provisional Application No. 62/563,631 filed on Sep. 26, 2017, the entire contents of which are herein incorporated by reference.

TECHNICAL FIELD

The present specification generally relates to vehicle systems for providing warnings of obstacle objects and, more specifically, to vehicle systems that classify the object into an object classification and predict a trajectory of the object based on a behavior of the object determined from a model corresponding to the object classification.

BACKGROUND

A vehicle may include an object detecting system that detects objects proximate to the vehicle with one or more sensors. For example, if the vehicle is approaching an object or the object is approaching the vehicle, the sensors of the vehicle may detect the changing distance between the vehicle and the object, and the vehicle may alert a driver based on the changing distance. However, it is difficult to predict a trajectory of an object accurately without having information about the object.

Accordingly, a need exists for vehicle systems that classify an object proximate to the vehicle into an object classification and predict a trajectory of the object based on a behavior of the object determined from a model corresponding to the object classification.

SUMMARY

In one embodiment, a vehicle system includes one or more sensors, one or more processors communicatively coupled to the one or more sensors, a memory module communicatively coupled to the one or more processors, and machine readable instructions stored in the memory module. The machine readable instructions, when executed by the processor, cause the system to: detect an object based on one or more signals output by the one or more sensors; classify the object into an object classification; predict a trajectory of the object based on a behavior of the object determined from a model corresponding to the object classification; predict a trajectory of the vehicle; and provide a warning based on the predicted trajectory of the object and the predicted trajectory of the vehicle.

In another embodiment, a method for predicting a trajectory of an object proximate to a vehicle is provided The method includes detecting an object based on one or more signals output by one or more sensors of the vehicle, classifying the object into an object classification, predicting a trajectory of the object based on at least one behavior characteristic of the object determined from a model corresponding to the object classification, predicting a trajectory of the vehicle, determining whether the detected object is likely to move from a non-obstacle position to an obstacle position based on the predicted trajectory of the object and the predicted trajectory of the vehicle, and providing a warning based on the predicted trajectory of the object and the predicted trajectory of the vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
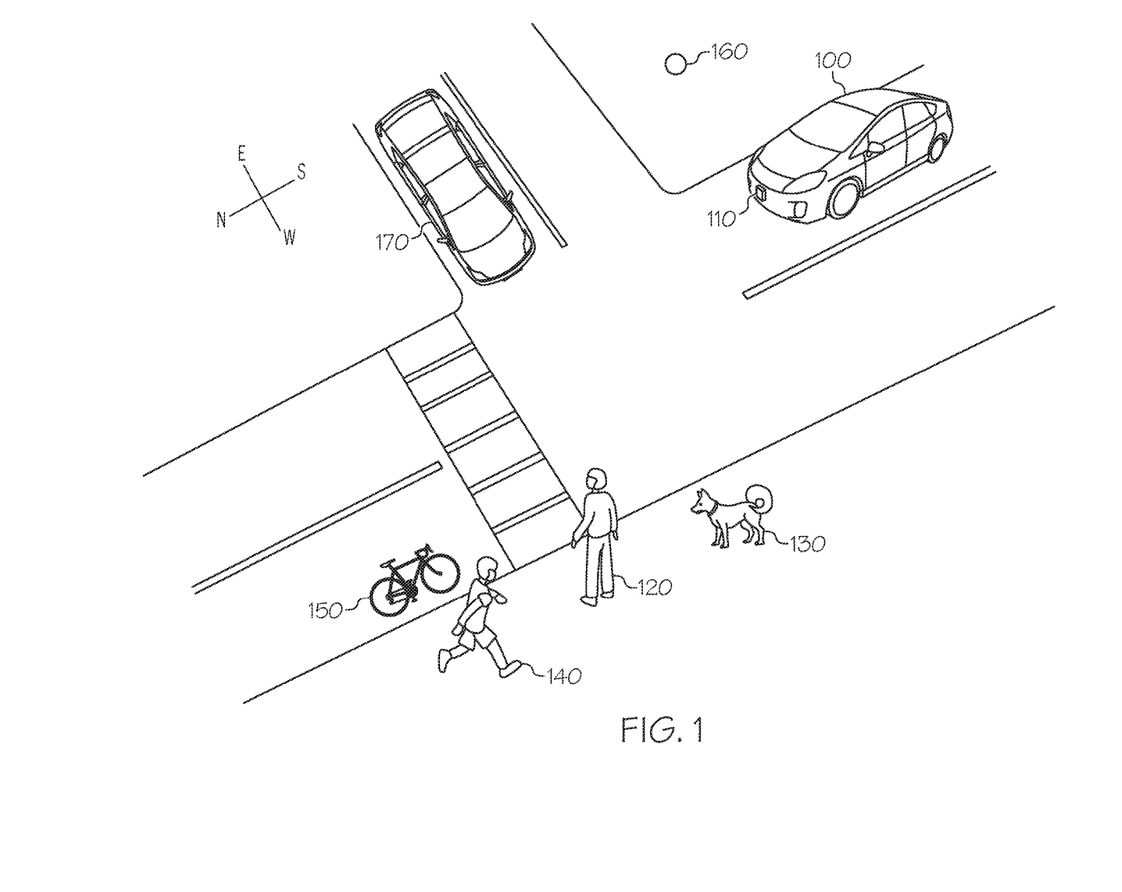
FIG. 1 schematically depicts a vehicle providing warnings based on predicted trajectories of obstacle objects, according to one or more embodiments shown and described herein.
Figure 2:
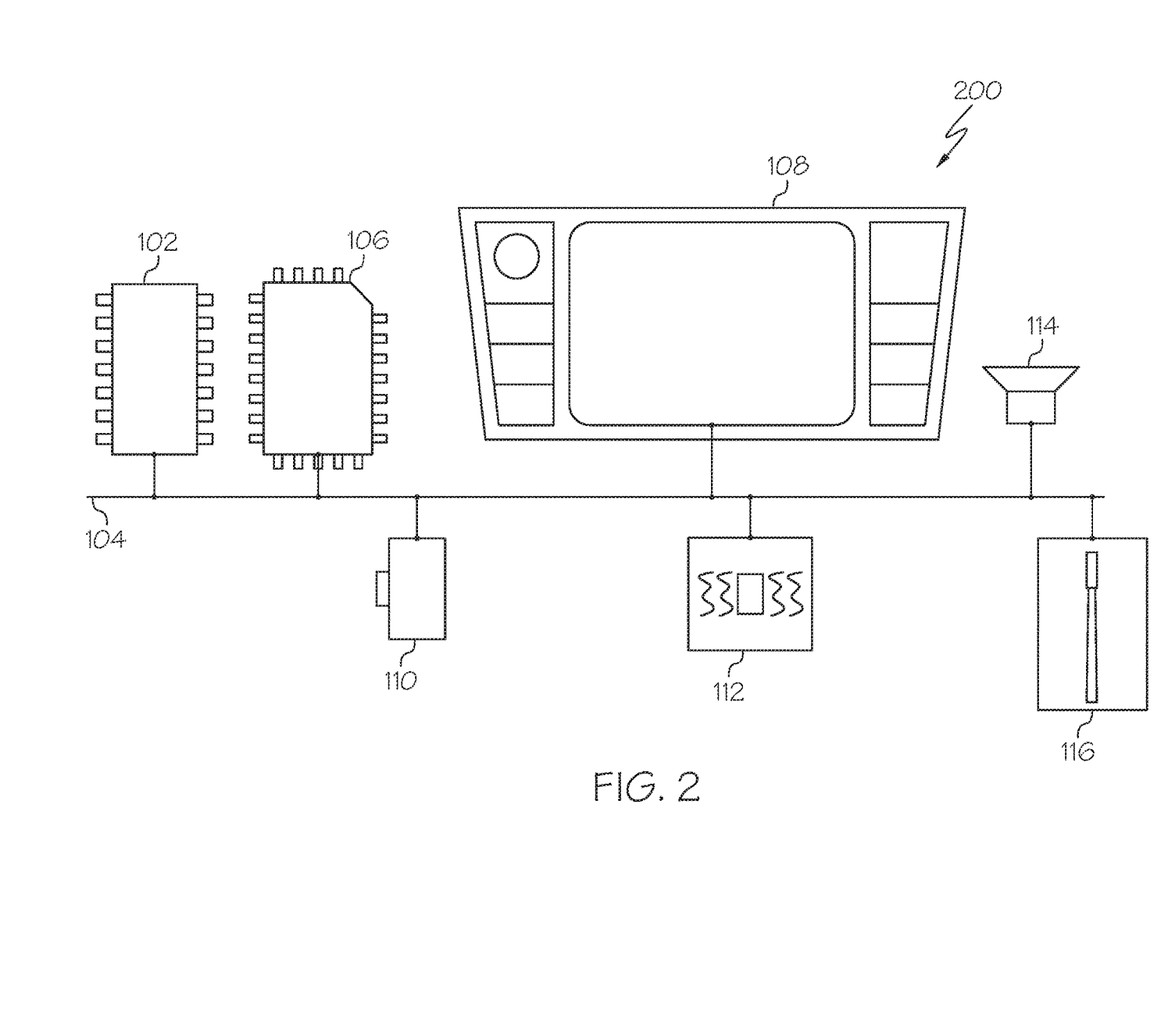
FIG. 2 schematically depicts a vehicle system according to one or more embodiments shown and described herein.

The embodiments disclosed herein include vehicles systems for predicting trajectories of objects proximate to vehicles. Referring generally to FIGS. 1 and 2, a vehicle system includes one or more sensors, one or more processors communicatively coupled to the one or more sensors, a memory module communicatively coupled to the one or more processors, and machine readable instructions stored in the memory module. The machine readable instructions, when executed by the processor, cause the system to: detect an object based on one or more signals output by the one or more sensors; classify the object into an object classification; predict a trajectory of the object based on a behavior of the object determined from a model corresponding to the object classification; predict a trajectory of the vehicle; and provide a warning based on the predicted trajectory of the object and the predicted trajectory of the vehicle.

FIG. 1 schematically depicts a vehicle 100 predicting likely trajectories of objects proximate to the vehicle 100 using one or more sensors 110, according to one or more embodiments shown and described herein. The vehicle 100 includes one or more sensors 110 for detecting and monitoring objects within a certain distance. The one or more sensors 110 may be any sensors configured to detect an object, including, for example, cameras, laser sensors, proximity sensors, LIDAR sensors, ultrasonic sensors, and the like. The one or more sensors 110 may be placed on the front, side, top and/or back of the vehicle 100. In embodiments, the one or more sensors 110 may detect objects within a predetermined range, for example, an object 120, an object 130, an object 140, an object 150, an object 160, an object 170, etc.

The vehicle 100 may classify each of the objects into an object classification, which will be described below with reference to FIG. 2. Once the objects are classified, the vehicle 100 may predict a trajectory of each of the objects based on a behavior of the object determined from a model corresponding to the object classification. The details of predicting a trajectory will be described below with reference to FIGS. 3-8. Objects may be either in a non-obstacle position or an obstacle position. The non-obstacle position is a position that is not in the driving trajectory of the vehicle 100. For example, if an object is on the sidewalk, the object is in the non-obstacle position because the object is not in the driving trajectory (e.g., road) of the vehicle 100. The obstacle position is a position that is in the driving trajectory of the vehicle 100. For example, if an object is on a road ahead of the vehicle 100, the object is in the obstacle position because the object is in the driving trajectory of the vehicle 100.

The vehicle 100 provides a warning to a driver of the vehicle 100 or objects proximate to the vehicle 100 if it is determined that the detected object is likely to move from a non-obstacle position to an obstacle position based on the predicted trajectory. For example, if the predicted trajectory of the object 130 is likely to conflict with a driving trajectory of the vehicle 100, i.e., the object 130 will be in the driving trajectory of the vehicle 100, the vehicle 100 may provide a warning to the driver of the vehicle 100.

Referring now to FIG. 2, an embodiment of a vehicle system 200 for predicting trajectories of objects and providing a warning based on the predicted trajectories is schematically depicted. It is noted that, while the vehicle system 200 is depicted in isolation, the vehicle system 200 may be included within a vehicle, for example, within the vehicle 100 of FIG. 1. In embodiments in which the vehicle system 200 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the vehicle system 200 may be embodied within a mobile device (e.g., smartphone, laptop computer, etc.) carried by an occupant of the vehicle.

Still referring to FIG. 2, the vehicle system 200 includes one or more processors 102. Each of the one or more processors 102 may be any device capable of executing machine readable instructions. For example, each of the one or more processors 102 may be a controller, an integrated circuit, a microchip, a computer, or any other computing device. The one or more processors 102 are coupled to a communication path 104 that provides signal interconnectivity between various modules of the system. Accordingly, the communication path 104 may communicatively couple any number of processors 102 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, it should be understood that the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, Near Field Communication (NFC) and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. In embodiments, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 further includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The one or more memory modules 106 may be non-transient memory modules. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 106 may include a database that includes object classifications and behavior characteristics for each of the object classifications. For example, the one or more memory modules 106 may include object classifications and behavior characteristics as described in Table 1 below. The one or memory modules 106 may include sample images for each of the standing person, the running person, the pet, the bicycle, the ball, the vehicle, etc.

TABLE 1

| Object Classification | Behavior Characteristics |
| --- | --- |
| Standing person | Follow sidewalk |
|  | Cross street at intersection or crosswalk |
|  | Move at a speed less than 3 miles/hour |
| Running person | Move in one direction |
|  | Follow sidewalk |
|  | Move at a speed between 4 miles/hour and 10 miles/hour |
| Pet | Randomly move direction |
|  | Follow person nearby |

TABLE 1-continued

| Object Classification | Behavior Characteristics |
|---|---|
| Bicycle | Follow bicycle lane |
| | Move at a speed up to 40 miles/hour |
| Ball | Move in one direction |
| | Do not change moving direction |
| Vehicle | Follow road |
| | Make turn at intersection |
| | Follow traffic rules |

Referring still to FIG. 2, the vehicle system 200 comprises one or more sensors 110 configured to detect and monitor objects within a threshold distance. For example, the one or more sensors 110 may be configured to detect and monitor objects within 100 meters, 50 meters, 25 meters, 10 meters, 5 meters etc. The threshold distance may be varied depending on the current speed of the vehicle 100. The one or more sensors 110 may be any sensors configured to detect an object, including, for example, cameras, laser sensors, proximity sensors, LIDAR sensors, ultrasonic sensors, and the like. For example, the one or more sensors 110 may be any device having an array of sensing devices (e.g., pixels) capable of detecting radiation in an ultraviolet wavelength band, a visible light wavelength band, or an infrared wavelength band. The one or more sensors 110 may have any resolution. The one or more sensors 110 may include an omni-directional camera, or a panoramic camera. In some embodiments, one or more optical components, such as a mirror, fish-eye lens, or any other type of lens may be optically coupled to the one or more sensors 110. The one or more sensors 110 may be used to capture an image of objects proximate to the vehicle 100. The one or more sensors 110 may include proximity sensor that detects a distance between the proximity sensor and an object nearby and communicates the proximity information to the one or more processors 102. The proximity sensor may be any device capable of outputting a proximity signal indicative of a distance of an object to the proximity sensor. In some embodiments, the proximity sensor may include a laser scanner, a capacitive displacement sensor, a Doppler effect sensor, an eddy-current sensor, an ultrasonic sensor, a magnetic sensor, an optical sensor, a radar sensor, a sonar sensor, or the like.

In some embodiments, the one or more sensors 110 may determine location information about objects relative to the vehicle 100. For example, the one or more sensors 110 may determine that the object 160 is located 10 meters from the vehicle 100, and located in a Northeast direction from the vehicle 100, as shown in FIG. 1. The one or more sensors 110 may detect the speed and moving direction of objects within the threshold distance. For example, the one or more sensors 110 may detect the speed of the object 160 in FIG. 1 and the moving direction of the object 160 relative to the moving direction of the vehicle 100.

The one or more processors 102 may implement instructions for comparing the image captured by the one or more sensors 110 with the sample images stored in the one or more memory modules 106 using image recognition processing, and classifying objects in the captured image based on the comparison. For example, if the captured image includes an object that matches with a sample image of a ball based on image recognition processing, that object is classified as a ball. As another example, if the captured image includes an object that matches with a sample image of a bicycle based on image recognition processing, that object is classified as a bicycle. In embodiments, any known image recognition processing may be used.

The one or more processors 102 may implement instructions for predicting a trajectory of the vehicle 100. The trajectory of the vehicle 100 may be predicted based on various factors including status of left or right turn signals, the current lane on which the vehicle 100 is present, a GPS route, etc. For example, if the left turn signal of the vehicle 100 is currently on, the trajectory of the vehicle 100 would be predicted as turning left at an intersection. As another example, if the vehicle 100 is on a right-turn-only lane, the trajectory of the vehicle 100 would be predicted as turning right at an intersection. As another example, if a driver entered destination information to a GPS navigator, the trajectory of the vehicle 100 would be predicted as matching with the route determined by the GPS navigator based on the current location and the destination.

The one or more processors 102 may implement instructions for predicting a trajectory of classified objects based on behavior characteristics of the classified object. For example, if an object within the threshold distance is classified as a pet, behavior characteristic for the pet (e.g., random moving direction, follow person nearby as described in Table 1 above) is retrieved, and the trajectory of the pet is predicted based on the behavior characteristic. Various examples of predicting trajectories are described below with reference to FIGS. 3 through 8.

The one or more processors 102 may implement instructions for determining that the detected object is likely to move from a non-obstacle position to an obstacle position based on the predicted trajectory of the object and the predicted trajectory of the vehicle. For example, if the predicted trajectory of the object overlaps with the predicted trajectory of the vehicle, it is determined that the detected object is likely to move from a non-obstacle position to an obstacle position.

The one or more processors 102 may implement instructions for providing a warning when it is determined that the detected object is likely to move from a non-obstacle position to an obstacle position, e.g., by providing a visual, audible, or tactile feedback.

Referring still to FIG. 2, the vehicle system 200 comprises a screen 108 for providing visual output such as, for example, maps, navigation, entertainment, warnings, alerts, or a combination thereof. The screen 108 may be located on the head unit of the vehicle such that a driver of the vehicle may easily see the screen 108 while seated in the driver seat. The screen 108 may provide a warning to the driver when an object detected by the one or more sensors 110 is currently in an obstacle position, or is going to be in an obstacle position based on the projected trajectory of an object and the projected trajectory of the vehicle 100.

The screen 108 is coupled to the communication path 104. Accordingly, the communication path 104 communicatively couples the screen 108 to other modules of the vehicle system 200 including, without limitation, the one or more processors 102 and/or the one or more memory modules 106. The screen 108 may include any medium capable of transmitting an optical output such as, for example, a cathode ray tube, a light emitting diode (LED) display, an organic light emitting diode (OLED) display, a liquid crystal display, a plasma display, or the like. In embodiments, the screen 108 may be a touch screen that, in addition to visually displaying information, detects the presence and location of a tactile input upon a surface of or adjacent to the screen 108.

In embodiments, the screen 108 may display the locations of the vehicle 100 and objects within a threshold distance from the vehicle 100 on a scaled map based on data received from the one or more sensors 110. For example, a map similar to FIG. 1 may be displayed on the screen 108. In some embodiments, the map shows the locations of the object 120, the object 130, the object 140, the object 150, the object 160, and the object 170 relative to the vehicle 100. If the object 160 is likely to move from a non-obstacle positon to an obstacle position, the screen 108 may highlight the object 160 and provide a warning that the object 160 is approaching the vehicle 100. A predicted trajectory of the object 160 may also be displayed on the screen 108. In some embodiments, only one or more objects that are likely to move from a non-obstacle position to an obstacle position may be displayed on the screen 108 in order to effectively inform objects at issue.

The vehicle system 200 may further comprise a tactile feedback device 112. The tactile feedback device 112 may be any device capable of providing tactile feedback to a user. The tactile feedback device 112 may include a vibration device (such as in embodiments in which tactile feedback is delivered through vibration), or a pressure generating device (such as in embodiments in which the tactile feedback is delivered through generated pressure). The tactile feedback device 112 may warn the driver by providing tactile feedback when an object detected by the one or more sensors 110 is currently in an obstacle position, or is going to be in an obstacle position based on the projected trajectory of the object and the projected trajectory of the vehicle 100.

The vehicle system 200 may further comprise a speaker 114 coupled to the communication path 104 such that the communication path 104 communicatively couples the speaker 114 to other modules of the vehicle system 200. The speaker 114 transforms data signals from the vehicle system 200 into audible mechanical vibrations. The speaker 114 may warn the driver by providing audible feedback when an object detected by the one or more sensors 110 is currently in an obstacle position, or is going to be in an obstacle position based on the projected trajectory of the object and the projected trajectory of the vehicle 100. For example, the speaker 114 may provide audible sound "Be careful of a bicycle on your right side" or "Be careful of a bicycle at the corner."

In embodiments, the vehicle system 200 may comprise a satellite antenna 116 coupled to the communication path 104 such that the communication path 104 communicatively couples the satellite antenna 116 to other modules of the vehicle system 200. The satellite antenna 116 is configured to receive signals from global positioning system satellites. Specifically, in one embodiment, the satellite antenna 116 includes one or more conductive elements that interact with electromagnetic signals transmitted by global positioning system satellites. The received signal is transformed into a data signal indicative of the location (e.g., latitude and longitude) of the satellite antenna 116 or an object positioned near the satellite antenna 116, by the one or more processors 102. Additionally, it is noted that the satellite antenna 116 may include at least one of the one or more processors 102 and the one or memory modules 106. The satellite antenna 116 may provide the current location of the vehicle 100. In some embodiments, the vehicle system 200 does not include the satellite antenna 116.

Still referring to FIG. 1, in embodiments, the vehicle system 200 can be formed from a plurality of modular units, i.e., the screen 108, the one or more sensors 110, the tactile feedback device 112, and the speaker 114, can be formed as modules communicatively coupled to one another to form the vehicle system 200. Accordingly, in some embodiments, each of the modules can include at least one of the one or more processors 102 and/or the one or more memory modules 106. It is noted that, while specific modules may be described herein as including one or more processors 102 and/or memory modules 106, the embodiments described herein can be implemented with the one or more processors 102 and memory modules 106 distributed throughout various communicatively coupled modules.

Figure 3:
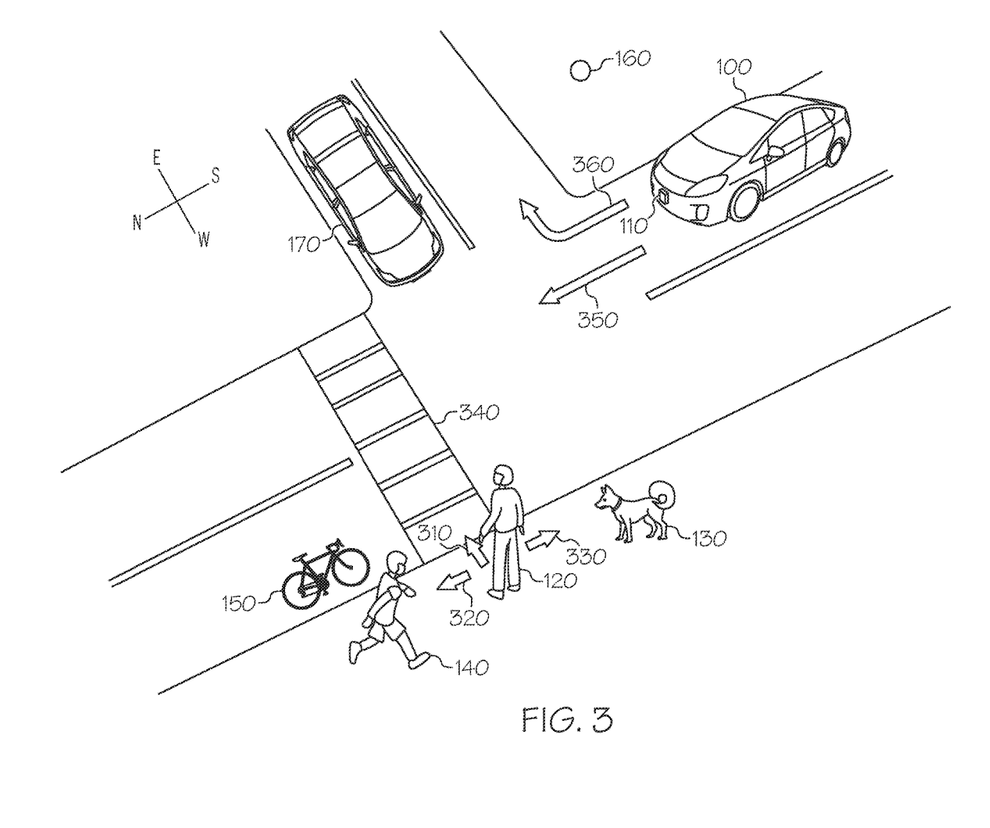
FIG. 3 depicts predicting a trajectory of a standing person, according to one or more embodiments shown and described herein.

FIG. 3 depicts predicting a trajectory of a standing person, according to one or more embodiments shown and described herein. The one or more sensors 110 detect the object 120. The one or more processors 102 of the vehicle system 200 classify the object 120 into an object classification of a standing person by comparing the captured image of the object 120 with sample images for standing people stored in the one or more memory modules 106. Then, the one or more processors 102 predict a trajectory of the object 120 based on behavior characteristics of the object 120 determined from a model corresponding to the object classification.

The behavior characteristics of the standing person may include, for example, "following the sidewalk," or "crossing a crosswalk if the standing person is close to the crosswalk" etc. The one or more processors 102 may predict three trajectories 310, 320, and 330 for the object 120 based on at least one of the behavior characteristic of the object 120, the current speed of the object 120, the current moving direction of the object 120, the current position of the object 120, and road marks or signs proximate to the object 120. The trajectory 310 shows that the object 120 is going to across the crosswalk 340. The trajectory 320 shows that the object 120 is going to move toward the North direction. The trajectory 330 shows that the object 120 is going to move toward the South direction.

In some embodiments, the one or more processors 102 may estimate the probability of each of the trajectories 310, 320, and 330 based on the behavior statistics database for standing people at the location where the object 120 is. The behavior statistics database may be stored in the one or more memory modules 106. The behavior statistics database may store object classification, location of the object, and likelihood of behavior. For example, the behavior statistics database may indicate that out of 100 standing people at the location where the object 120 is, 80 people crossed the crosswalk 340, 15 people moved toward the South direction, and 5 people moved toward the North direction. In this regard, the one or more processors 102 may assign 80% likelihood to the trajectory 310, 15% likelihood to the trajectory 330, and 5% likelihood to the trajectory 320.

The one or more processors 102 may also predict a trajectory of the vehicle 100 based on various factors including status of left or right turn signals, the current lane on which the vehicle 100 is present, etc. Two potential trajectories 350 and 360 may exist for the vehicle 100 in FIG. 3. If the right turn signal of the vehicle 100 is on or the vehicle 100 is on a right turn only lane, the one or more processors 102 may find the trajectory 360 as the trajectory for the vehicle 100. Otherwise, the one or more processors 102 may find the trajectory 350 as the trajectory for the vehicle 100.

The one or more processors 102 may determine whether the predicted trajectories of the object 120 overlap with the trajectories of the vehicle 100. For example, if the object 120 is predicted to follow the trajectory 310 and the vehicle 100 is predicted to follow the trajectory 350, the one or more processors 102 determines that the predicted trajectory of the object 120 overlaps with the trajectory of the vehicle 100, and provides a warning to a driver of the vehicle 100 through the screen 108, the tactile feedback device 112, or the speaker 114.

In some embodiments, the one or more processors 102 may predict the probability that the predicted trajectory of the object 120 overlap with the trajectory of the vehicle 100 based on the probability of the trajectory of the object 120 and the probability of the trajectory of the vehicle 100. For example, if the one or more processors 102 estimate the probability of the trajectory 350 as 50% for the vehicle 100 and the one or more processors 102 estimate the probability of each of the trajectories 310, 320, and 330, as 80%, 5%, and 15%, the one or more processors 102 may predict the probability of overlap as 40% (50% times 80%) because the trajectory 310 is the only trajectory that overlaps with the trajectory 350 of the vehicle 100, the probability of the trajectory 310 is 80%, and the probability of the trajectory 350 is 50%. The level of feedback may be determined based on the probability of overlap. For example, the level of warning by the speaker 114 may be proportion to the probability of overlap.

In some embodiments, the one or more sensors 110 may keep track of the object 120, and obtain the actual trajectory of the object 120. If the object 120 follows the trajectory 310, then one or more processors 102 update the statistics database for standing people by adding the incident of the object 120 crossing the crosswalk 340. If the object 120 shows a new behavior that is not registered in the statistics database, such as jaywalking the street, the one or more processors 102 update the behavior statistics database by adding the incident of the object 120 jaywalking the street. In this regard, behavior of standing people at the location where the object 120 is may be updated in real time.

Figure 4:
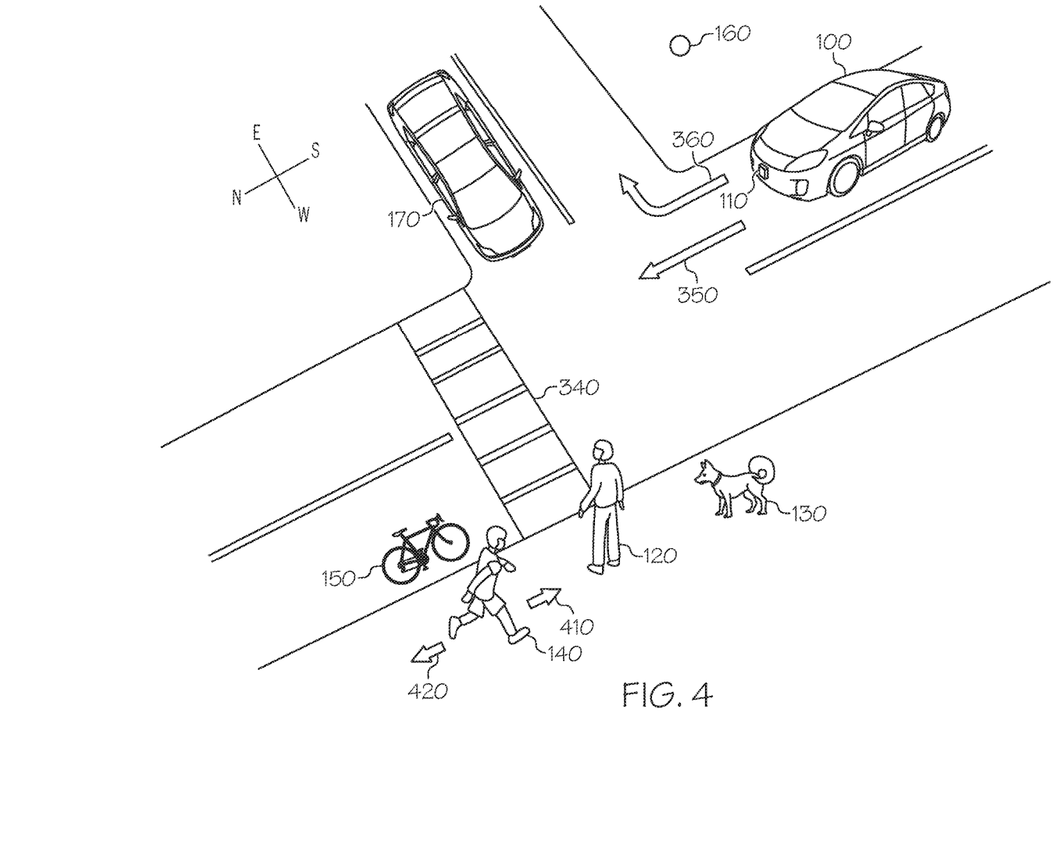
FIG. 4 depicts predicting a trajectory of a running person, according to one or more embodiments shown and described herein.

FIG. 4 depicts predicting a trajectory of a running person, according to one or more embodiments shown and described herein. The one or more sensors 110 detect the object 140. The one or more processors 102 of the vehicle system 200 classify the object 140 into an object classification of a running person by comparing the captured image of the object 140 with sample images for running people stored in the one or more memory modules 106. Then, the one or more processors 102 predict a trajectory of the object 140 based on behavior characteristics of the object 140 determined from a model corresponding to the object classification.

The behavior characteristics of the running person may include, for example, "moving in one direction," "following sidewalk," "moving at a speed between 4 mile/hour and 10 mile/hour," etc. The one or more processors 102 may predict two trajectories 410 and 420 for the object 140 based on at least one of the behavior characteristic of the object 140, the current speed of the object 140, the current moving direction of the object 140, the current position of the object 140, and road marks or signs proximate to the object 140. The trajectory 410 shows that the object 140 is going to move toward the South direction. The trajectory 420 shows that the object 140 is going to move toward the North direction.

In some embodiments, the one or more processors 102 may estimate the likelihood of each of the trajectories 410 and 420 based on the behavior statistics database for running people at the location where the object 140 is. For example, the behavior statistics database may indicate that out of 100 running people at the location where the object 140 is, no people crossed the crosswalk 340, 50 people moved toward the South direction, and 50 people moved toward the North direction. In this regard, the one or more processors 102 may assign 50% likelihood to the trajectory 410, and 50% likelihood to the trajectory 420. Unlike to the object 120, the one or more processors 102 may find that the object 140 is not likely to cross the crosswalk 340.

The one or more processors 102 may also predict a trajectory of the vehicle 100 similar to the description above with respect to FIG. 3. In this embodiment, two potential trajectories 350 and 360 may exist for the vehicle 100 in FIG. 3. If the right turn signal of the vehicle 100 is on or the vehicle 100 is on a right turn only lane, the one or more processors 102 may predict the trajectory 360 as the trajectory for the vehicle 100. Otherwise, the one or more processors 102 may predict the trajectory 350 as the trajectory for the vehicle 100.

The one or more processors 102 may determine whether the predicted trajectories of the object 140 overlap with the trajectories of the vehicle 100. In this embodiment, both trajectories 410 and 420 of the object 140 do not overlap with the trajectories 350 and 360 of the vehicle 100. Thus, the one or more processors 102 may not instruct the screen 108, the tactile feedback device 112, or the speaker 114 to provide a warning with respect to the object 140.

In some embodiments, the one or more sensors 110 may keep track of the object 140, and obtain the actual trajectory of the object 140. If the object 140 shows a new behavior that is not registered in the behavior statistics database, such as crossing the crosswalk, the one or more processors 102 update the behavior statistics database by adding the incident of the object 140 crossing the crosswalk. In this regard, behavior of running people at that location may be updated in real time.

Figure 5:
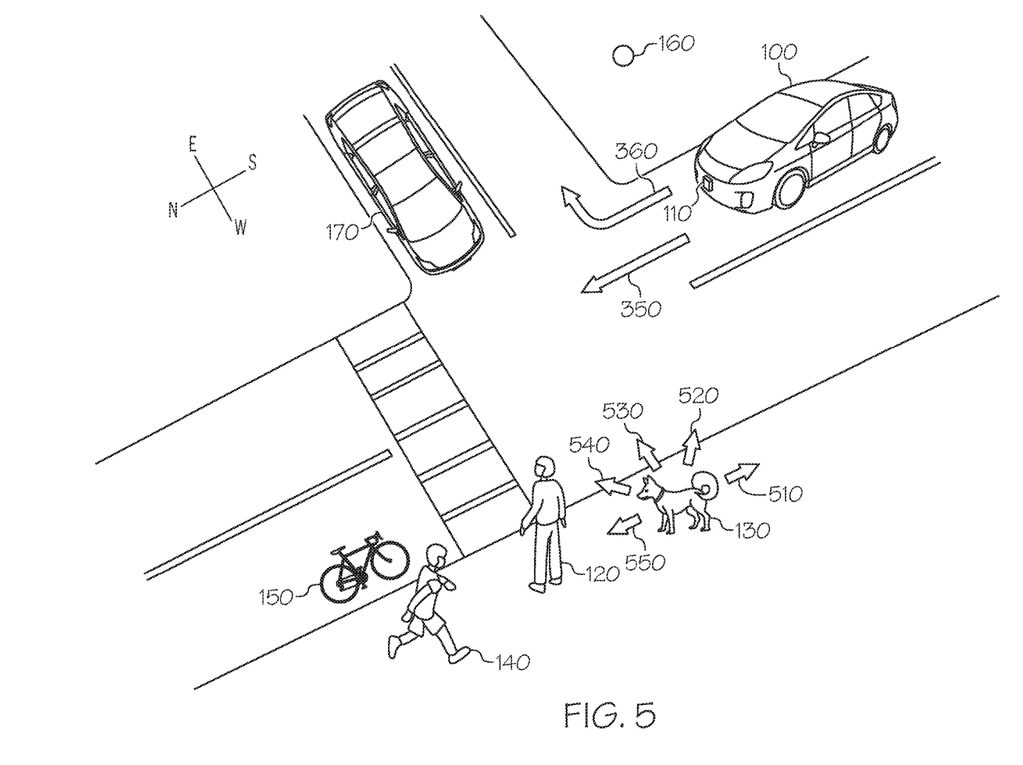
FIG. 5 depicts predicting a trajectory of a pet, according to one or more embodiments shown and described herein.

FIG. 5 depicts predicting a trajectory of a pet (e.g., a dog, a cat, etc.), according to one or more embodiments shown and described herein. The one or more sensors 110 detect the object 130. The one or more processors 102 of the vehicle system 200 classify the object 130 into an object classification of a pet by comparing the captured image of the object 130 with sample images for pets stored in the one or more memory modules 106. Then, the one or more processors 102 predict a trajectory of the object 130 based on behavior characteristics of the object 130 determined from a model corresponding to the object classification.

The behavior characteristics of the pet may include, for example, "moving in random directions," "following a person nearby," etc. The one or more processors 102 may predict trajectories 510, 520, 530, 540, and 550 for the object 130 based on at least one of the behavior characteristic of the object 130, the current speed of the object 130, the current moving direction of the object 130, the current position of the object 130, and road marks or signs proximate to the object 130. For example, because pets have the behavior characteristic of moving in random directions, the predicted trajectories for the object 130 may be random.

In some embodiments, the one or more processors 102 may estimate the likelihood of each of the trajectories 510, 520, 530, 540, and 550 based on the behavior statistics database for pets at the location where the object 130 is. For example, the behavior statistics database may indicate that out of 100 pets at the location where the object 130 is, 50 pets followed the trajectory 550, 30 followed the trajectory 510, 10 followed the trajectory 540, and 10 followed the trajectory 530. In this regard, the one or more processors 102 may assign 50% likelihood to the trajectory 550, 30% likelihood to the trajectory 510, 10% likelihood to the trajectory 540, and 10% likelihood to the trajectory 530.

The one or more processors 102 may also predict a trajectory of the vehicle 100 similar to the description above with respect to FIG. 3. In this embodiment, two potential trajectories 350 and 360 may exist for the vehicle 100 in FIG. 3. If the right turn signal of the vehicle 100 is on or the vehicle 100 is on a right turn only lane, the one or more processors 102 may find the trajectory 360 as the trajectory for the vehicle 100. Otherwise, the one or more processors 102 may find the trajectory 350 as the trajectory for the vehicle 100.

The one or more processors 102 may determine whether the predicted trajectories of the object 130 overlap with the trajectories of the vehicle 100. For example, if the object 130 is predicted to follow the trajectory 530 and the vehicle 100 is predicted to follow the trajectory 350, the one or more processors 102 determines that the predicted trajectory of the object 130 overlaps with the trajectory of the vehicle 100, and provides a warning to a driver of the vehicle 100 through the screen 108, the tactile feedback device 112, or the speaker 114.

In some embodiments, the one or more sensors 110 may keep track of the object 130, and obtain the actual trajectory of the object 130. If the object 130 shows a new behavior that is not registered in the behavior statistics database, such as moving North and crossing the crosswalk, the one or more processors 102 update the behavior statistics database by adding the incident of the object 130 moving East and crossing the crosswalk. In this regard, behavior of pets at that location may be updated in real time.

Figure 6:
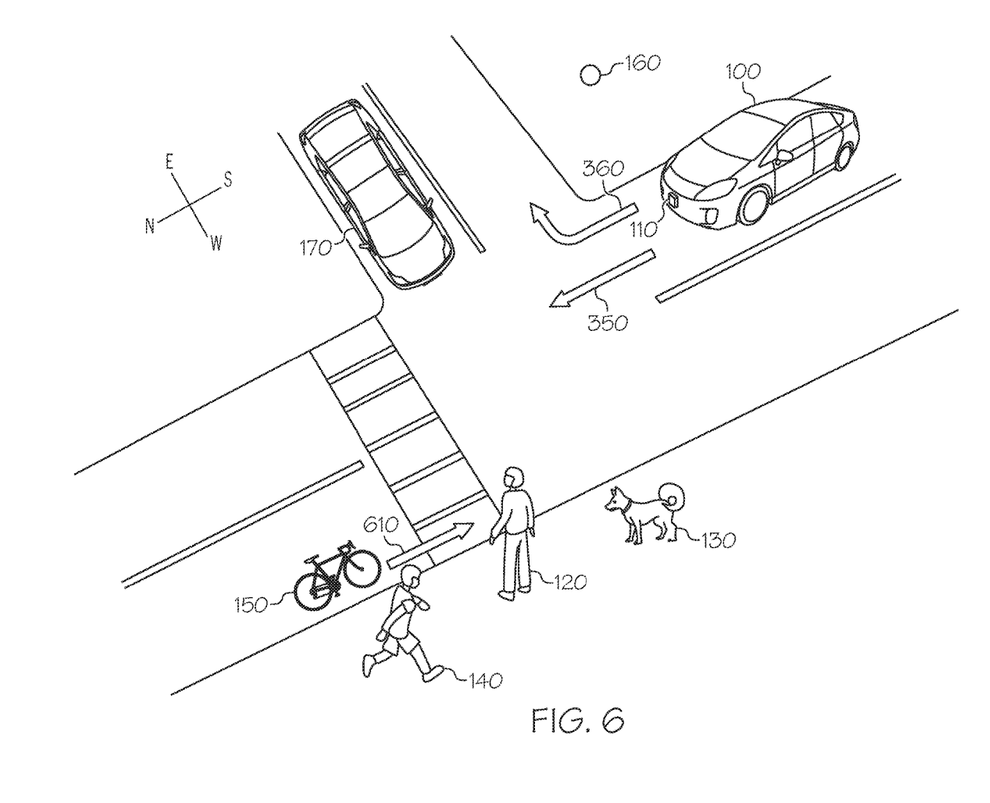
FIG. 6 depicts predicting a trajectory of a bicyclist, according to one or more embodiments shown and described herein.

FIG. 6 depicts predicting a trajectory of a bicycle (typically, including a person riding the bicycle), according to one or more embodiments shown and described herein. The one or more sensors 110 detect the object 150. The one or more processors 102 of the vehicle system 200 classify the object 150 into an object classification of a bicycle by comparing the captured image of the object 150 with sample images for bicycles stored in the one or more memory modules 106. Then, the one or more processors 102 predict a trajectory of the object 150 based on behavior characteristics of the object 150 determined from a model corresponding to the object classification.

The behavior characteristics of the bicycle may include, for example, "following a bicycle lane," "moving at a speed up to 40 mile/hour," etc. The one or more processors 102 may predict one trajectory 610 for the object 150 based on at least one of the behavior characteristic of the object 150, the current speed of the object 150, the current moving direction of the object 150, the current position of the object 150, and road marks or signs proximate to the object 150. The trajectory 610 shows that the object 150 is going to move toward the South direction.

The one or more processors 102 may also predict a trajectory of the vehicle 100 similar to the description above with respect to FIG. 3. In this embodiment, two potential trajectories 350 and 360 may exist for the vehicle 100 in FIG. 3. If the right turn signal of the vehicle 100 is on or the vehicle 100 is on a right turn only lane, the one or more processors 102 may find the trajectory 360 as the trajectory for the vehicle 100. Otherwise, the one or more processors 102 may find the trajectory 350 as the trajectory for the vehicle 100.

The one or more processors 102 may determine whether the predicted trajectory of the object 150 overlaps with the trajectories of the vehicle 100. In this embodiment, the trajectory 610 of the object 150 does not overlap with the trajectories 350 and 360 of the vehicle 100. Thus, the one or more processors 102 do not instruct the screen 108, the tactile feedback device 112, or the speaker 114 to provide a warning with respect to the object 150.

In some embodiments, the one or more sensors 110 may keep track of the object 150, and obtain the actual trajectory of the object 150. If the object 150 shows a new behavior that is not registered in the behavior statistics database, such as making a left turn at the intersection, the one or more processors 102 update the behavior statistics database by adding the incident of the object 150 making a left turn at the intersection. In this regard, behavior of bicycles at that location may be updated in real time.

Figure 7:
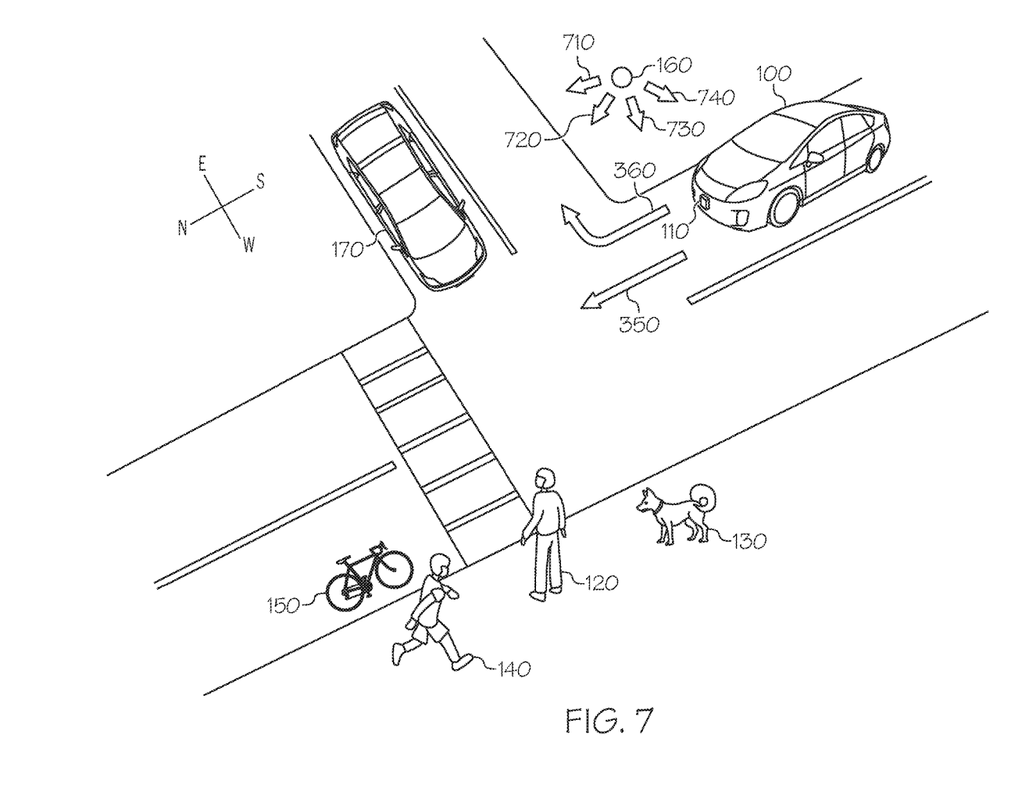
FIG. 7 depicts predicting a trajectory of a ball, according to one or more embodiments shown and described herein.

FIG. 7 depicts predicting a trajectory of a ball, according to one or more embodiments shown and described herein. The one or more sensors 110 detect the object 160. The one or more processors 102 of the vehicle system 200 classify the object 160 into an object classification of a ball by comparing the captured image of the object 160 with sample images for balls stored in the one or more memory modules 106. Then, the one or more processors 102 predict a trajectory of the object 160 based on behavior characteristics of the object 160 determined from a model corresponding to the object classification.

The behavior characteristics of the ball may include, for example, "moving in one direction," "not changing moving direction," etc. The one or more processors 102 may predict trajectories 710, 720, 730, or 740 for the object 160 based on at least one of the behavior characteristic of the object 160, the current speed of the object 160, the current moving direction of the object 160, the current position of the object 160, and road marks or signs proximate to the object 160. For example, if it is determined that the current moving direction of the object 160 is Northwest, the one or more processors 102 may predict the trajectory 720 for the object 160.

The one or more processors 102 may also predict a trajectory of the vehicle 100 similar to the description above with respect to FIG. 3. In this embodiment, two potential trajectories 350 and 360 may exist for the vehicle 100 in FIG. 3. If the right turn signal of the vehicle 100 is on or the vehicle 100 is on a right turn only lane, the one or more processors 102 may find the trajectory 360 as the trajectory for the vehicle 100. Otherwise, the one or more processors 102 may find the trajectory 350 as the trajectory for the vehicle 100.

The one or more processors 102 may determine whether the predicted trajectories of the object 160 overlap with the trajectories of the vehicle 100. For example, if the object 160 is predicted to follow the trajectory 720 and the vehicle 100 is predicted to follow the trajectory 350, the one or more processors 102 determines that the predicted trajectory of the object 160 overlaps with the trajectory of the vehicle 100, and provides a warning to a driver of the vehicle 100 through the screen 108, the tactile feedback device 112, or the speaker 114.

Figure 8:
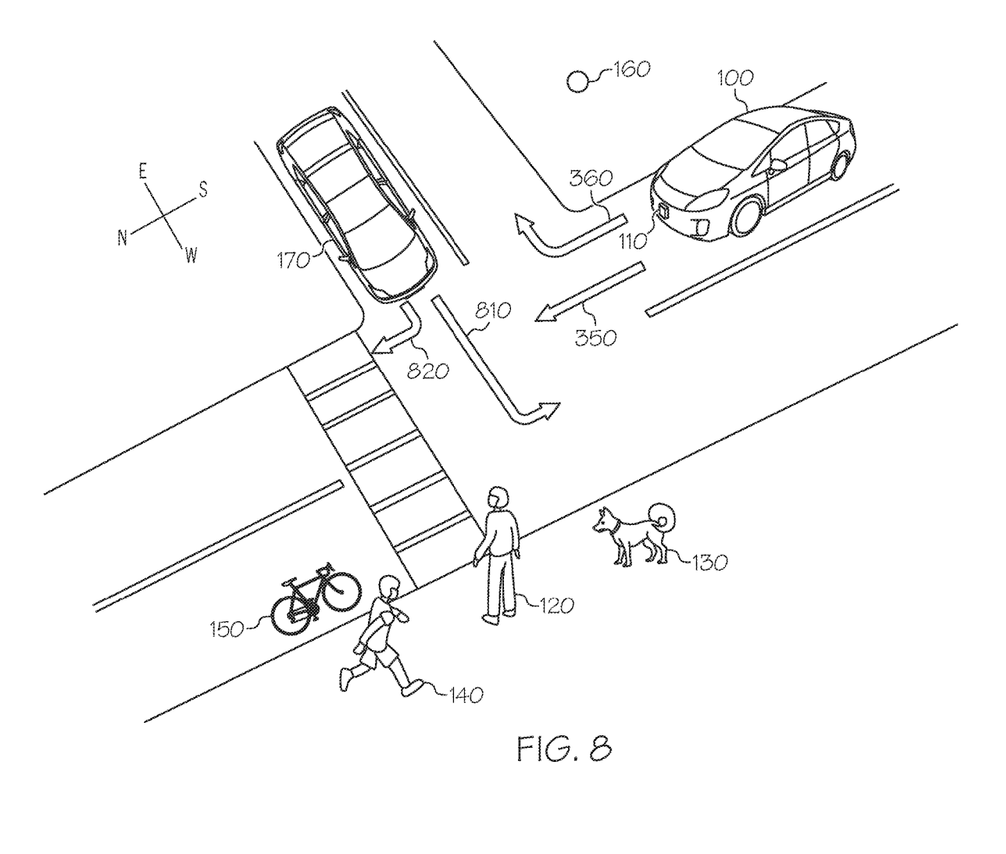
FIG. 8 depicts predicting a trajectory of another vehicle, according to one or more embodiments shown and described herein.

FIG. 8 depicts predicting a trajectory of a vehicle, according to one or more embodiments shown and described herein. The one or more sensors 110 detect the object 170. The one or more processors 102 of the vehicle system 200 classify the object 170 into an object classification of a vehicle by comparing the captured image of the object 170 with sample images for vehicles stored in the one or more memory modules 106. Then, the one or more processors 102 predict a trajectory of the object 170 based on behavior characteristics of the object 170 determined from a model corresponding to the object classification.

The behavior characteristics of the vehicle may include, for example, "following roads," "making turn at intersection," "following traffic rules," etc. The one or more processors 102 may predict one trajectories 810 and 820 for the object 170 based on at least one of the behavior characteristic of the object 170, the current speed of the object 170, the current moving direction of the object 170, the current position of the object 170, and traffic signals proximate to the object 170. The trajectory 810 shows that the object 170 is going to make a left turn at the intersection. The trajectory 820 shows that the object 170 is going to make a right turn at the intersection.

The one or more processors 102 may also predict a trajectory of the vehicle 100 similar to the description above with respect to FIG. 3. In this embodiment, two potential trajectories 350 and 360 may exist for the vehicle 100 in FIG. 3. If the right turn signal of the vehicle 100 is on or the vehicle 100 is on a right turn only lane, the one or more processors 102 may find the trajectory 360 as the trajectory for the vehicle 100. Otherwise, the one or more processors 102 may find the trajectory 350 as the trajectory for the vehicle 100.

The one or more processors 102 may determine whether the predicted trajectory of the object 170 overlap with the trajectories of the vehicle 100. For example, if the object 170 is predicted to follow the trajectory 810 and the vehicle 100 is predicted to follow the trajectory 350, the one or more processors 102 determines that the predicted trajectory of the object 170 overlaps with the trajectory of the vehicle 100, and provides a warning to a driver of the vehicle 100 through the screen 108, the tactile feedback device 112, or the speaker 114. If the object 170 is predicted to follow the trajectory 810 and the vehicle 100 is predicted to follow the trajectory 360, the one or more processors 102 determines that the predicted trajectory of the object 170 does not overlap with the trajectory of the vehicle 100, and does not provide a warning to the driver with respect to the object 170.

Figure 9:
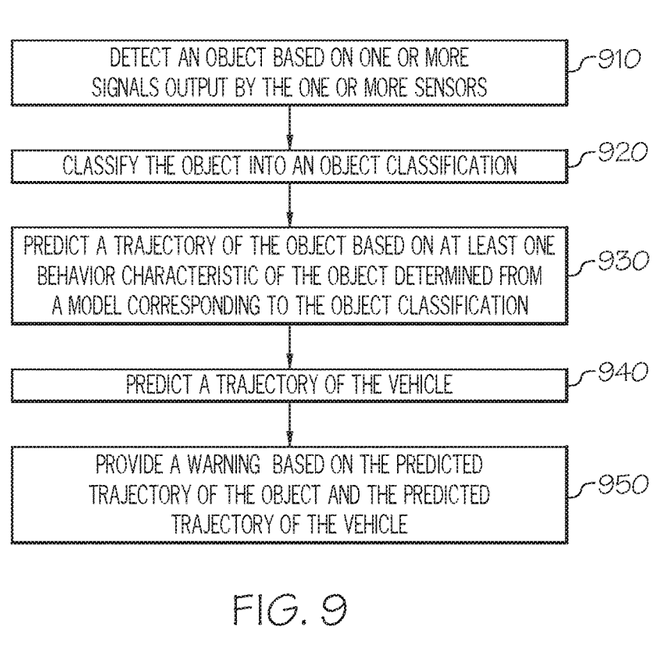
FIG. 9 depicts flowchart of one method for providing warnings based on predicted trajectories of obstacle objects in accordance with one or more embodiments shown and described herein.

FIG. 9 depicts a flowchart of providing warnings based on predicted trajectories of obstacle objects, according to one or more embodiments shown and described herein. In step 910, the one or more processors 102 of the vehicle 100 detect an object based on one or more signals output by the one or more sensors 110. For example, a camera of the vehicle 100 may capture the objects 120, 130, 140, 150, 160, and 170.

In step 920, the one or more processors 102 classify the object into an object classification. For example, if the capture image includes the object 160 that matches with a sample image of a ball based on image recognition processing, the object 160 is classified as a ball. As another example, if the captured image includes the object 170 that matches with a sample image of a vehicle based on image recognition processing, the object 170 is classified as a vehicle.

In step 930, the one or more processors 102 predict a trajectory of the object based on behavior characteristics of the object determined from a model corresponding to the object classification. For example, if the object is classified as a pet, the one or more processors 102 predict the trajectory of the pet based on the behavior characteristics of the pet such as "moving in random directions," "following a person nearby," etc. Thus, the one or more processors 102 may predict the trajectory of the pet as a trajectory in random direction or a trajectory toward a person nearby. As another example, if the object is classified as a vehicle, the one or more processors 102 predict the trajectory of the vehicle based on the behavior characteristics of the vehicle such as "following roads," "making turn at intersection," "following traffic rules," etc.

In step 940, the one or more processors 102 predict a trajectory of the vehicle. The trajectory of the vehicle 100 may be predicted based on various factors including status of left or right turn signals, the current lane on which the vehicle 100 is present, a GPS route, etc.

In step 950, the one or more processors 102 instruct an output device to provide a warning in response to determination that the detected object is likely to move from a non-obstacle position to an obstacle position based on the predicted trajectory of the object and the predicted trajectory of the vehicle 100. For example, if the predicted trajectory of the vehicle 100 is the trajectory 360 in FIG. 7, and the predicted trajectory of the object 160 is the trajectory 710 in FIG. 7, then it is determined that the ball is likely to move from a non-obstacle position to an obstacle position. In response to the determination that the ball is likely to move from a non-obstacle position to an obstacle position, an output device of the vehicle 100 provides a warning to a driver.

It should be understood that embodiments described herein are directed to vehicle systems for providing warnings of obstacle objects. A vehicle system includes one or more sensors, one or more processors communicatively coupled to the one or more sensors, a memory module communicatively coupled to the one or more processors, and machine readable instructions stored in the memory module. The machine readable instructions, when executed by the processor, cause the system to: detect an object based on one or more signals output by the one or more sensors; classify the object into an object classification; predict a trajectory of the object based on behavior characteristics of the object determined from a model corresponding to the object classification; predict a trajectory of the vehicle; and provide a warning based on the predicted trajectories of the object and the vehicle. By predicting trajectories of objects based on behavior characteristics of the object determined from a model corresponding to the object classification, the vehicle system described herein enhances the accuracy of predicting trajectories of objects. Specifically, the vehicle system predicts trajectories of objects based on behavior characteristic of a classified object. In addition, the vehicle system described herein provides warnings of obstacle objects in advance of potential accidents or collisions based on the predicted trajectories of the obstacle objects.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for a vehicle, the system comprising:
one or more sensors;
one or more processors communicatively coupled to the one or more sensors;
a memory module storing a behavior statistics database including behavior information of an object; and machine readable instructions stored in the memory module that, when executed by the one or more processors, cause the system to:
detect the object based on one or more signals output by the one or more sensors;
determine a location of the object;
classify the object into an object classification;
predict a trajectory of the object based on a behavior characteristic of the object determined from a model corresponding to the object classification;
predict a trajectory of the vehicle;
provide a warning based on the predicted trajectory of the object and the predicted trajectory of the vehicle;
monitor behavior of the object by the one or more sensors;
determine whether a behavior of the object is registered in the behavior statistics database; and
add the behavior of the object to the behavior statistics database in response to determining that behavior of the object is not registered in the behavior statistics database.

2. The system of claim 1, wherein the machine readable instructions stored in the memory module, when executed by the one or more processors, cause the system to:
predict the trajectory of the object based further on a current speed of the object.

3. The system of claim 1, wherein the machine readable instructions stored in the memory module, when executed by the one or more processors, cause the system to:
predict the trajectory of the object based further on a current direction of the object.

4. The system of claim 1, wherein the machine readable instructions stored in the memory module, when executed by the one or more processors, cause the system to:
predict the trajectory of the object based further on a road mark or a road sign.

5. The system of claim 1, wherein the machine readable instructions stored in the memory module, when executed by the one or more processors, cause the system to:
classify the object into the object classification by comparing an image of the object captured by the one or more sensors to one or more images associated with the object classification.

6. The system of claim 1, wherein the object classification comprises at least one of a bicycle, a pet, a ball, a vehicle, a standing person, and a running person.

7. The system of claim 1, further comprising a screen, wherein:
the screen is configured to display the object and the vehicle on a map, and
the screen is configured to display the warning based on the predicted trajectory of the object and the predicted trajectory of the vehicle.

8. The system of claim 1, further comprising a speaker, wherein the speaker is configured to provide the warning based on the predicted trajectory of the object and the predicted trajectory of the vehicle.

9. The system of claim 8, wherein the warning includes an indication of the object classification of the object.

10. The system of claim 1, wherein the machine readable instructions stored in the memory module, when executed by the one or more processors, cause the system to:
predict the trajectory of the vehicle based on a turn signal of the vehicle or a lane on which the vehicle is positioned.

11. The system of claim 1, wherein the machine readable instructions stored in the memory module, when executed by the one or more processors, cause the system to:
determine a probability of the trajectory of the vehicle;
determine a probability of the trajectory of the object; and
determine a probability that the object is likely to move from a non-obstacle position to an obstacle position based on the probability of the trajectory of the vehicle and the probability of the trajectory of the object.

12. A method for predicting a trajectory of a non-vehicle object proximate to a vehicle, the method comprising:
detecting the non-vehicle object based on one or more signals output by one or more sensors of the vehicle;
determining a location of the non-vehicle object;
classifying the non-vehicle object into an object classification;
predicting a trajectory of the non-vehicle object based on a behavior characteristic of the non-vehicle object determined from a model corresponding to the object classification;
predicting a trajectory of the vehicle;
determining whether the detected non-vehicle object is likely to move from a non-obstacle position to an obstacle position based on the predicted trajectory of the non-vehicle object and the predicted trajectory of the vehicle;
providing a warning based on the predicted trajectory of the non-vehicle object and the predicted trajectory of the vehicle;
monitoring behavior of the object by the one or more sensors;
determining whether a behavior of the object is registered in a behavior statistics database; and
adding the behavior of the object to the behavior statistics database in response to determining that behavior of the object is not registered in the behavior statistics database.

13. The method of claim 12, wherein classifying the non-vehicle object into the object classification comprises comparing an image of the non-vehicle object captured by the one or more sensors to one or more images associated with the object classification.

14. The method of claim 12, wherein the object classification comprises at least one of a bicycle, a pet, a ball, a standing person, and a running person.

15. The method of claim 12, further comprising:
displaying the non-vehicle object and the vehicle on a map on a screen of the vehicle; and
highlighting the object on the map based on the predicted trajectory of the non-vehicle object and the predicted trajectory of the vehicle.

16. The method of claim 12, further comprising:
determining a probability of the trajectory of the vehicle;
determining a probability of the trajectory of the non-vehicle object; and
determining a probability that the non-vehicle object is likely to move from a non-obstacle position to an obstacle position based on the probability of the trajectory of the vehicle and the probability of the trajectory of the non-vehicle object.

17. The system of claim 1, wherein the behavior characteristic includes information pertaining to whether the object moves in random directions.

18. The system of claim 11, wherein a level of the warning is proportionate to the probability that the object is likely to move from the non-obstacle position to the obstacle position.

19. The system of claim 1, wherein the behavior characteristic of the object is determined from the model corresponding to the object classification and the behavior information of the object in association with a predetermined location, when the predetermined location matches the location of the object.

20. The method of claim 12, wherein the behavior characteristic of the object is determined from the model corresponding to the object classification and the behavior information of the object in association with a predetermined location, when the predetermined location matches the location of the object.

* * * * *